United States Patent
Otsuka

(10) Patent No.: US 6,243,796 B1
(45) Date of Patent: *Jun. 5, 2001

(54) RECORDING MEDIUM AND RECORDING OR REPRODUCTION APPARATUS THAT PROVIDES PROTECTION FROM UNAUTHORIZED USE OF THE MEDIUM

(75) Inventor: Satoshi Otsuka, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/904,280

(22) Filed: Jul. 31, 1997

(30) Foreign Application Priority Data

Aug. 5, 1996 (JP) .................................... 8-220758

(51) Int. Cl.[7] ..................................... G06F 12/14
(52) U.S. Cl. ......................... 711/163; 711/111; 711/112; 711/164; 713/200
(58) Field of Search .................................. 711/163, 164, 711/111, 112, 115; 395/186, 188.01, 726; 380/3, 4, 25; 360/60, 69; 713/200, 202; 710/200

(56) References Cited

U.S. PATENT DOCUMENTS

| | | | |
|---|---|---|---|
| 4,975,898 | | 12/1990 | Yoshida ................................ 369/100 |
| 5,058,162 | * | 10/1991 | Santon et al. .......................... 380/25 |
| 5,191,611 | * | 3/1993 | Lang ...................................... 380/25 |
| 5,375,243 | * | 12/1994 | Parzych et al. .................. 395/188.01 |
| 5,461,603 | | 10/1995 | Otsuka ................................. 369/120 |
| 5,627,895 | * | 5/1997 | Owaki .................................... 380/54 |
| 5,737,413 | * | 4/1998 | Akiyama et al. ........................ 380/4 |
| 5,790,499 | * | 8/1998 | Itoh ...................................... 711/111 |
| 5,809,545 | * | 9/1998 | Ozaki et al. .......................... 711/164 |
| 5,949,601 | * | 9/1999 | Braithwaite et al. ................... 360/60 |
| 6,067,640 | * | 5/2000 | Akiyama et al. ....................... 714/38 |

FOREIGN PATENT DOCUMENTS 63-20769   1/1988   (JP) .............................. G11B/20/12

OTHER PUBLICATIONS

"Microsoft Windows 95 Resource Kit, " Microsoft Press, pp. 80, 88, 1995.*

* cited by examiner

Primary Examiner—Do Hyun Yoo
Assistant Examiner—Gary J. Portka
(74) Attorney, Agent, or Firm—Oblon, Spivak, McClelland, Maier & Neustadt, P.C.

(57) ABSTRACT

A recording-medium ID information, which is condition information read from the recording medium loaded into a recording and reproduction apparatus, is compared with the ID information unique to the apparatus. When they have the correct relationship, a recording or reproduction operation is permitted for the recording medium. As another condition information, an ID to be input is additionally specified. When the correct ID is input, a recording or reproduction operation to the recording medium is allowed. Thus, a multiple-level protection function is achieved.

2 Claims, 15 Drawing Sheets

AE

ARW

AE
ARW

AE
ARW

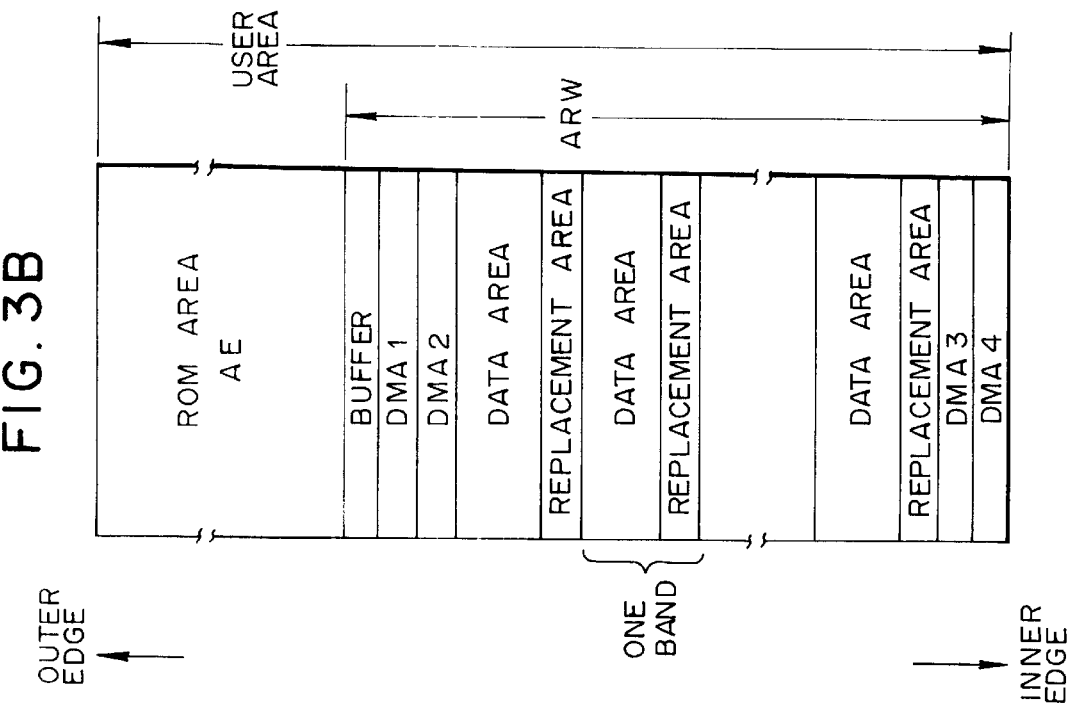
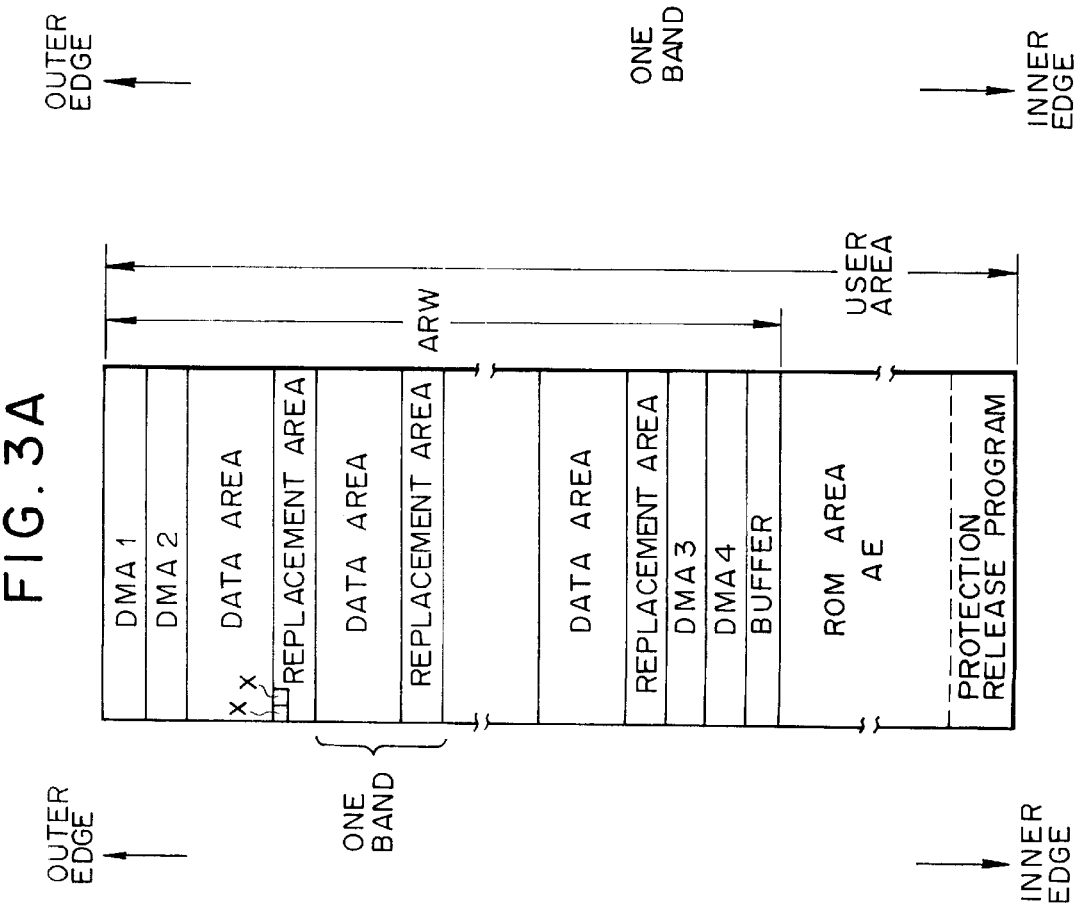

FIG. 5

| BYTE | CONTENTS |
|---|---|
| 0 ~ 19 | SAME INFORMATION AS IN GCP DATA (20 BYTES) |
| 20 ~ 29 | MEDIUM INFORMATION |
| 30 ~ 99 | SYSTEM INFORMATION |
| 100 ~ 419 | BAND INFORMATION |
| 420 ~ 499 | ID AREA |
| 500 ~ 2047 | RESERVED |

FIG. 6

| 0 0 h | 0 0 0 0 0 0 0 0 | ROM MEDIUM |
|---|---|---|
| 2 0 h | 0 0 1 0 0 0 0 0 | RAM MEDIUM |
| A 0 h | 1 0 1 0 0 0 0 0 | PARTIAL ROM MEDIUM |
| 1 0 h | 0 0 0 1 0 0 0 0 | ROM MEDIUM WITH PROTECTION FUNCTION |
| 3 0 h | 0 0 1 1 0 0 0 0 | RAM MEDIUM WITH PROTECTION FUNCTION |
| B 0 h | 1 0 1 1 0 0 0 0 | PARTIAL ROM MEDIUM WITH PROTECTION FUNCTION |

| BYTE | | TYPE CODE |
|---|---|---|
| 76 | TYPE OF BAND 0 | 0 0 0 0 0 0 0 1 |
| 77 | TYPE OF BAND 1 | 1 0 0 0 0 0 0 1 |
| 78 | TYPE OF BAND 2 | 1 0 0 0 0 0 0 1 |
| 79 | TYPE OF BAND 3 | 1 1 0 0 0 0 0 1 |
| 80 | TYPE OF BAND 4 | 0 0 1 0 0 0 0 1 |
| 81 | TYPE OF BAND 5 | 0 0 1 0 0 0 0 1 |
| 82 | TYPE OF BAND 6 | 1 0 0 0 0 0 0 1 |
| 83 | TYPE OF BAND 7 | 1 0 0 0 0 0 0 1 |
| 84 | TYPE OF BAND 8 | 0 0 0 0 0 0 1 0 |
| 85 | TYPE OF BAND 9 | 0 0 0 0 0 0 1 0 |
| 86 | TYPE OF BAND 10 | 1 1 1 0 0 0 1 0 |
| 87 | TYPE OF BAND 11 | 1 0 0 0 0 0 1 0 |
| 88 | TYPE OF BAND 12 | 1 0 0 0 0 0 1 0 |
| 89 | TYPE OF BAND 13 | 1 1 0 0 0 0 1 0 |
| 90 | TYPE OF BAND 14 | 0 0 0 1 0 0 1 0 |
| 91 | TYPE OF BAND 15 | 1 1 1 1 0 0 1 0 |

FIG. 8

| BYTE | |
|---|---|
| 420 ~ 435 | MEDIUM ID |
| 436 ~ 451 | FIRST ID |
| 452 ~ 467 | SECOND ID |
| 468 ~ 483 | THIRD ID |
| 484 ~ 499 | FOURTH ID |

FIG. 9A

| | | | | | | | | | |
|---|---|---|---|---|---|---|---|---|---|
| $F_{RW}$ | OFF | | | | | | | | |
| $F_{MP}$ | OFF | | | | | | | | |
| | | $F_{PB0}$ ON | $F_{PB1}$ OFF | $F_{PB2}$ OFF | $F_{PB3}$ OFF | $F_{PB4}$ OFF | $F_{PB5}$ OFF | $F_{PB6}$ OFF | ---- $F_{PB15}$ OFF |
| $F_{FB0}$ | | 0 0 0 0 | | | | | | | |
| $F_{FB1}$ | | | 1 0 0 0 | | | | | | |
| $F_{FB2}$ | | | | 1 0 0 0 | | | | | |
| $F_{FB3}$ | | | | | 1 1 0 0 | | | | |
| $F_{FB4}$ | | | | | | 0 0 1 0 | | | |
| $F_{FB5}$ | | | | | | | 0 0 1 0 | | |
| $F_{FB6}$ | | | | | | | | 1 0 0 0 | |
| ---- | | | | | | | | | |
| $F_{FB15}$ | | | | | | | | | 1 1 1 1 |
| | | MEDIUM ID | FIRST ID | SECOND ID | THIRD ID | FOURTH ID | | | |

FIG. 9B

| OFF | ON | | | | | | | |
|---|---|---|---|---|---|---|---|---|
| | ON | ON | OFF | OFF | OFF | OFF | OFF | OFF |
| | | 0 0 0 0 | 1 0 0 0 | 1 0 0 0 | 1 1 0 0 | 0 0 1 0 | 1 0 0 0 | 1 1 1 1 |
| | | MEDIUM ID | FIRST ID | SECOND ID | THIRD ID | FOURTH ID | | |

FIG. 9C

| OFF | ON | | | | | | | |
|---|---|---|---|---|---|---|---|---|
| | ON | ON | ON | ON | OFF | OFF | OFF | ON | OFF |
| | | 0 0 0 0 | 0 0 0 0 | 0 0 0 0 | 0 1 0 0 | 0 0 1 0 | 0 0 1 0 | 0 0 0 0 | 0 1 1 1 |
| | | MEDIUM ID | FIRST ID | SECOND ID | THIRD ID | FOURTH ID | | |

FIG. 9D

| ON | ON | | | | | | | |
|---|---|---|---|---|---|---|---|---|
| | ON | ON | ON | ON | ON | ON | ON | ON | ON |
| | | 0 0 0 0 | 0 0 0 0 | 0 0 0 0 | 0 0 0 0 | 0 0 0 0 | 0 0 0 0 | 0 0 0 0 | 0 0 0 0 |
| | | MEDIUM ID | FIRST ID | SECOND ID | THIRD ID | FOURTH ID | | |

FIG. 10A

| | | |
|---|---|---|
| $F_{RW}$ | OFF | |
| $F_{MP}$ | OFF | |
| $F_{FB0}$ | 0 0 0 0 | ON |
| $F_{FB1}$ | 0 0 0 0 | ON |
| $F_{FB2}$ | 0 0 0 0 | ON |
| $F_{FB3}$ | 0 0 0 0 | ON |
| $F_{FB4}$ | 0 0 0 0 | ON |
| $F_{FB5}$ | 0 0 0 0 | ON |
| $F_{FB6}$ | 0 0 0 0 | ON |
| ⋮ | ⋮ | ⋮ |
| $F_{FB15}$ | 0 0 0 0 | ON |

| | |
|---|---|
| $F_{PB0}$ | 0 0 0 0 ON |
| $F_{PB1}$ | 0 0 0 0 ON |
| $F_{PB2}$ | 0 0 0 0 ON |
| $F_{PB3}$ | 0 0 0 0 ON |
| $F_{PB4}$ | 0 0 0 0 ON |
| $F_{PB5}$ | 0 0 0 0 ON |
| $F_{PB6}$ | 0 0 0 0 ON |
| ⋮ | ⋮ |
| $F_{PB15}$ | 0 0 0 0 ON |
| MEDIUM ID | |
| FIRST ID | |
| SECOND ID | |
| THIRD ID | |
| FOURTH ID | |

FIG. 10B

| | |
|---|---|
| | ON |
| | ON |
| 0 0 0 0 | ON |
| 0 0 0 0 | ON |
| 0 0 0 0 | ON |
| 0 0 0 0 | ON |
| 0 0 0 0 | ON |
| 0 0 0 0 | ON |
| 0 0 0 0 | ON |
| ⋮ | ⋮ |
| 0 0 0 0 | ON |
| MEDIUM ID | |
| FIRST ID | |
| SECOND ID | |
| THIRD ID | |
| FOURTH ID | |

RECORDING MEDIUM AND RECORDING OR REPRODUCTION APPARATUS THAT PROVIDES PROTECTION FROM UNAUTHORIZED USE OF THE MEDIUM

BACKGROUND OF THE INVENTION

1. Field of the Invention

The present invention relates to recording media suited for storing computer software, recording apparatuses or reproduction apparatuses therefor, and recording methods or reproduction methods therefor.

2. Description of the Related Art

Various types of software used in computers have been offered with recording media such as optical disks, magneto-optical disks, magnetic disks, memory cards, and magnetic tape.

As a type of such recording media, a partial ROM disk has been developed. The partial ROM disk includes a ROM area used only for reproduction and a rewritable area (RAM area) for recording and reproduction.

It is preferred that only an authorized user who has bought an application program stored in a medium can use the program.

Files and other data which the user has stored in a recording medium are required to be kept in confidentiality.

In some cases, it is desired that they cannot be read by other persons or they cannot be rewritten without permission.

Therefore, it is demanded that a protection function is implemented so that various types of data stored in a recording medium cannot be read/written by other persons.

It is known that a simple protection function such as that requiring an ID input to a recording and reproduction apparatus or a personal computer is weak in protection and a more effective protection function is demanded.

SUMMARY OF THE INVENTION

Accordingly, it is an object of the present invention to provide an effective protection function for data stored in a recording medium such that its confidentiality is maintained and its unauthorized use is prevented.

The foregoing object is achieved according to one aspect of the present invention through the provision of a recording-medium driving apparatus including: protection-function detecting means for detecting whether a recording medium has a protection function; comparison means for comparing first identification information recorded in the recording medium with second identification information of the recording-medium driving apparatus when the recording medium has a protection function; and control means for disabling access to the recording medium via an information signal when the comparison means detects that the predetermined relationship does not exist between the first identification information and the second identification information.

The recording-medium driving apparatus may be configured such that the protection-function detecting means detects whether protection information is recorded in the recording medium, and the control means enables access to the recording medium via an information signal when the comparison means detects that the predetermined relationship exists between the first identification information and the second identification information and when the protection information matches input information input by the user.

The recording-medium driving apparatus may be configured such that the recording medium includes a plurality of storage areas and stores the protection information with respect to each storage area, and the comparison means compares the protection information with the input information for each storage area to be accessed.

The recording-medium driving apparatus may be configured such that the control means determines that access to each storage area via the information signal is enabled.

The foregoing object is achieved according to another aspect of the present invention through the provision of a recording-medium driving method including the steps of: detecting whether a recording medium has a protection function; comparing first identification information recorded in the recording medium with second identification information of a recording-medium driving apparatus when the recording medium has a protection function; and disabling access to the recording medium via an information signal when it is detected in the comparing step that the predetermined relationship does not exist between the first identification information and the second identification information.

The recording-medium driving method may be configured such that it is detected in the step of detecting the protection function whether protection information is recorded in the recording medium.

The foregoing object is achieved according to still another aspect of the present invention through the provision of a recording medium including a first recording area on which protection-function identification information is recorded which indicates whether a protection function for limiting access via an information signal by a recording-medium driving apparatus is provided, and a second recording area on which condition information for releasing the limit of access via an information signal by the protection function is recorded.

The recording medium may further include a third recording area on which protection-function release program information for releasing the protection function for the recording-medium driving apparatus is recorded.

BRIEF DESCRIPTION OF THE DRAWINGS

FIGS. 3A and 3B are views illustrating a user-area configuration of the partial ROM disk.

FIG. 5 is a view showing data in the SFP zones of a partial ROM disk according to the embodiment.

FIG. 6 is a view showing medium-type codes which include protection-function identification information for a partial ROM disk according to the embodiment.

FIG. 8 shows ID areas for the partial ROM disk according to the embodiment.

FIGS. 9A, 9B, 9C, and 9D are views illustrating a protection-function release operation according to the embodiment.

FIGS. 10A and 10B are views illustrating a protection-function release operation according to the embodiment.

DETAILED DESCRIPTION OF THE PREFERRED EMBODIMENT

An embodiment of the present invention will be described below in the following order. A partial ROM disk is taken as an example of recording media in the embodiment.

1. Area configuration of a partial ROM disk
2. Configuration of a recording and reproduction apparatus
3. Protection-function identification information and condition information recorded in a disk
4. Data protection

1. Area Configuration of a Partial ROM Disk

Figure 1A:
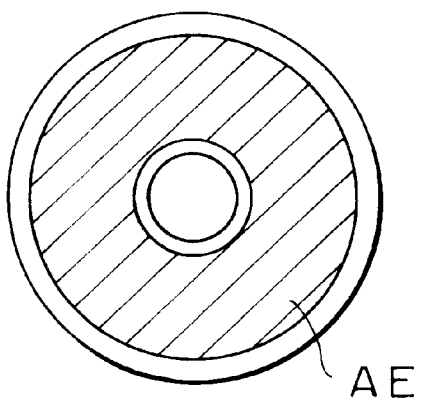
FIGS. 1A, 1B, 1C, and 1D show various types of disks.
Figure 1B:
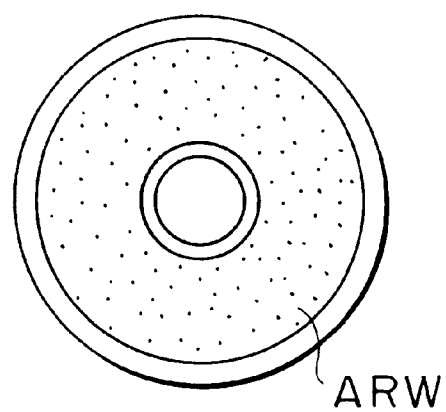

FIGS. 1A to 1D show various disk media. FIG. 1A shows a ROM disk having a main data area which entirely works as a reproduction-only area (ROM area) AE formed by, for example, embossed pits. FIG. 1B illustrates a RAM disk having a main data area which entirely works as a recording and reproducing rewritable area ARW, such as a magneto-optical area.

Figure 1C:
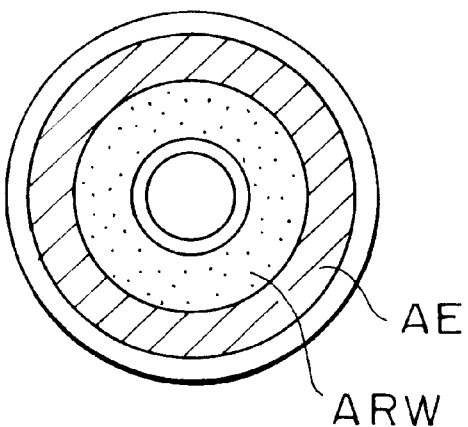
Figure 1D:
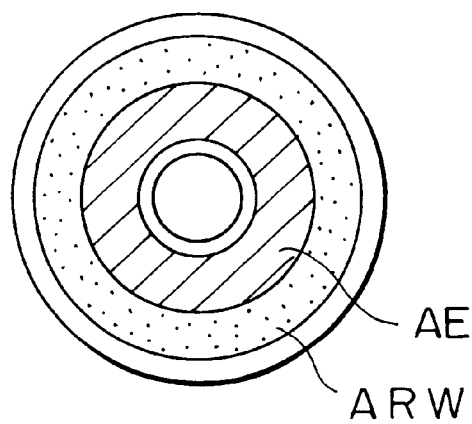

A partial ROM disk, which serves as a recording medium in the present embodiment, has a structure shown in FIG. 1C or FIG. 1D. In the main data area, a partial ROM disk has both a ROM area AE and a rewritable area ARW.

The ROM disk shown in FIG. 1A and the RAM disk shown in FIG. 1B can also be taken as a recording medium of the present invention. In other words, the present invention can also be applied to the ROM disk and the RAM disk when information which is equivalent to condition information such as recording-medium ID information (medium ID described later) employed in the partial ROM disk described later and protection-function identification information (medium type described later) is recorded in the disks. The partial ROM disk is just an example.

Figure 2:
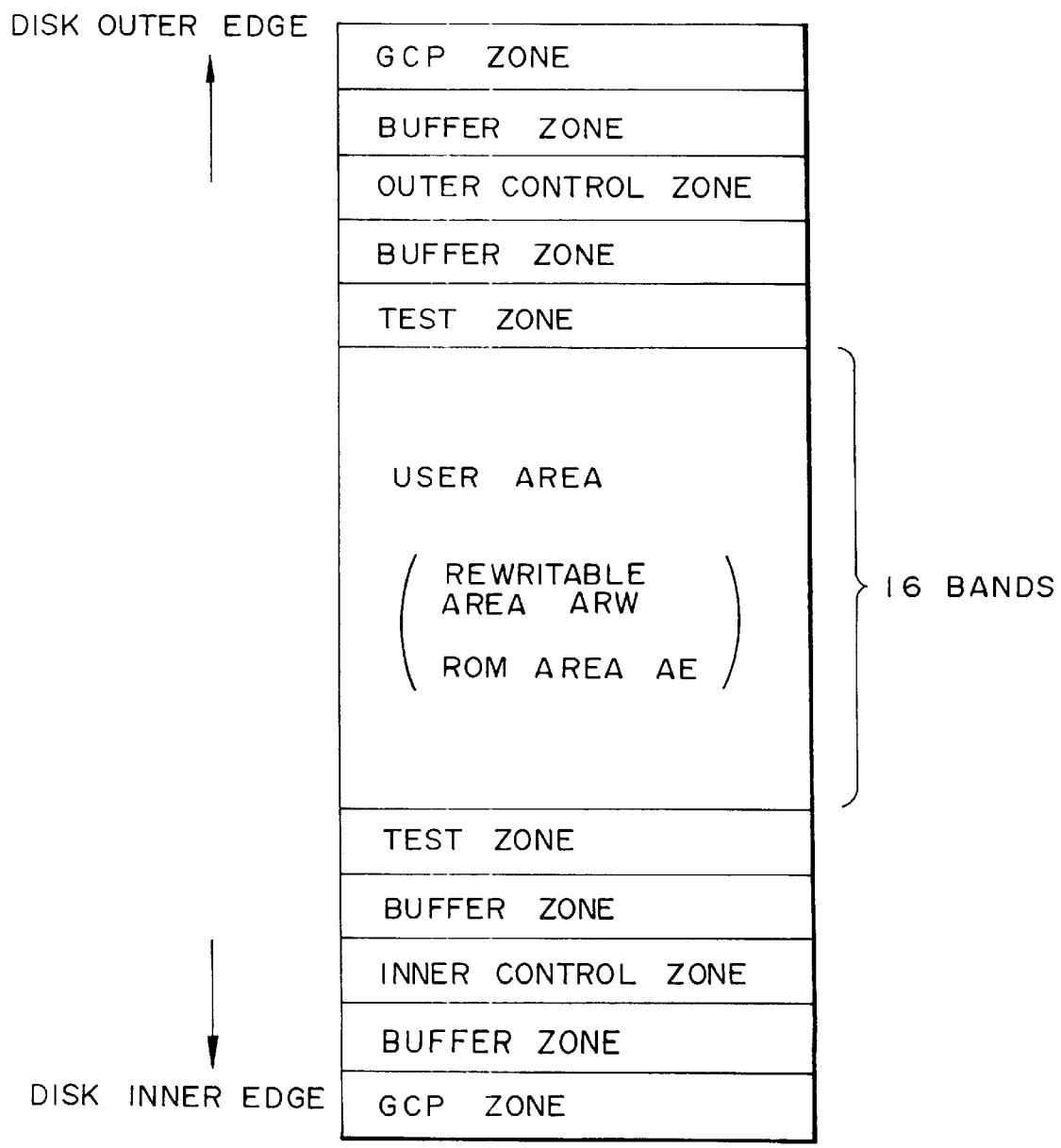
FIG. 2 is a view illustrating an area configuration of a partial ROM disk.

FIG. 2 shows the area structure of the partial ROM disk from the outer edge to the inner edge.

Near the outer edge, a gray code part (GCP) zone of 736 tracks is provided. Toward the inner edge, a buffer zone of two tracks, an outer control SFP zone of five tracks, a buffer zone of two tracks, a test zone of five tracks are also provided. Next to the test zone, a user area which serves as a main data area including a reproduction-only ROM area AE and a rewritable area ARW into which the user can record the desired data is provided.

Toward the inner edge from the user area, a test zone of five tracks, a buffer zone of two tracks, an inner control SFP zone of five tracks, a buffer zone of two tracks, and a GCP zone of 820 tracks are provided.

The GCP zones, the outer control SFP zone, and the inner control SFP zone record the specified control information. Details will be described later. In the present embodiment, condition information such as recording-medium ID information (medium ID), other ID information, and various ID flags, and protection-function identification information such as a medium type are recorded in these zones.

This partial ROM disk is a so-called zone CAV disk, which is rotated at a constant speed for each zone, and the user area is divided into 16 bands (16 zones), band 0 to band 15.

The manufacturer can specify the ratio of a rewritable area ARW to the ROM area AE in the 16 bands.

FIGS. 3A and 3B show in detail the structure of the rewritable area ARW in the user area having 16 bands. FIG. 3A illustrates a case in which a rewritable area ARW is provided closer to the disk outer edge than a ROM area is. FIG. 3B illustrates a case in which a rewritable area ARW is provided closer to the disk inner edge than a ROM area is.

In each figure, at the top of the rewritable area ARW, defect management areas DMA1 and DMA2 are provided. At the end of the writable area ARW, defect management areas DMA3 and DMA4 are also provided. An area adjacent to the ROM area AE serves as a buffer area.

In every band, a data area and a replacement area for the data area are provided. Therefore, when the rewritable area ARW occupies n bands in the 16 bands, n data areas and n replacement areas are provided. If a data area has a defective portion in which either recording or reproduction, or both cannot be done due to, for example, scratches, the corresponding replacement area offers a portion which is used as a substitute for the defective portion.

As shown in FIG. 3A, if a data area has the defective portions indicated by crosses, recording portions substituting for the portions having crosses are specified at the positions indicated by arrows in the corresponding replacement area.

The defect management areas DMA1 to DMA4 control such a replacement condition and record information used for enabling appropriate recording and reproduction at portions other than defective portions.

In physical formatting of a disk, a data area is searched for a defective portion, a portion substituting for a defective portion, if any, is specified in the corresponding replacement area, and information for the defect management areas DMA1 to DMA4 is created and recorded in the rewritable area ARW. In other words, a disk is set to the state shown in FIGS. 3A or 3B by physical formatting, and the rewritable area ARW is set such that recording and reproduction is physically enabled To actually write a file into a rewritable area ARW, it is necessary to perform logical formatting to a disk which has been physically formatted and to write a file system which controls recording and reproduction in the rewritable area ARW. After physical formatting and logical formatting are performed, the user can use a partial ROM disk as a software medium.

A detailed description of logical formatting will be omitted. This logical formatting mainly writes a file system at the top of the rewritable area ARW for managing files in the rewritable area ARW and the ROM area AE. A setup system which is a tool for this logical formatting is recorded in the ROM area AE in advance. As shown in FIGS. 3A and 3B, a protection release program described later is also recorded in the ROM area AE.

2. Configuration of a Recording and Reproduction Apparatus

Figure 4:
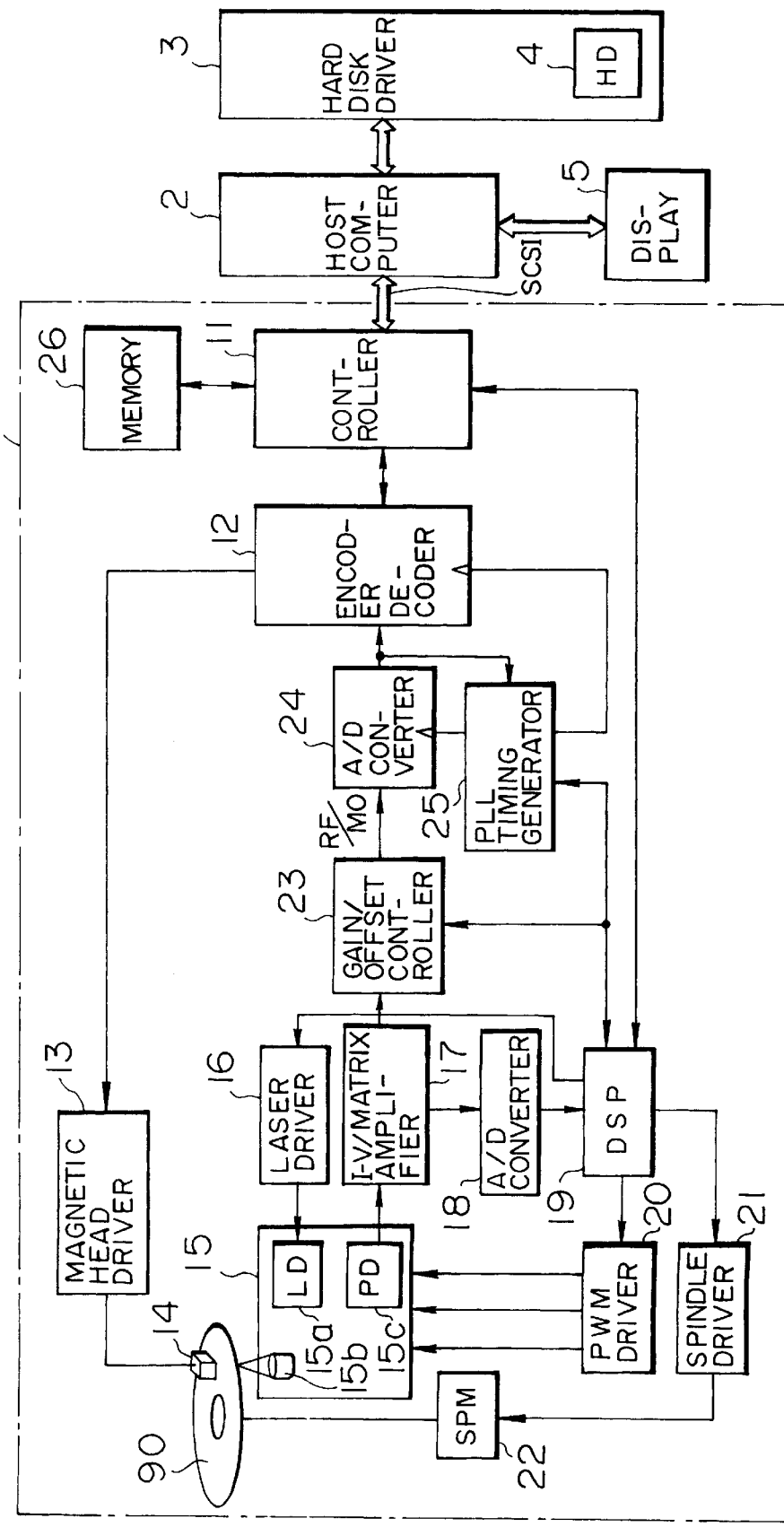
FIG. 4 is a block diagram of a recording and reproduction apparatus according to an embodiment.

FIG. 4 shows a configuration of a recording and reproduction apparatus.

The recording and reproduction apparatus 1 is configured such that it can send and receive commands and data to and from the host computer 2 (personal computer in some cases) connected through the SCSI interface. The apparatus 1 records data in a disk 90 according to commands and data received from the host computer 2. The apparatus 1 also read data from the disk 90 according to commands received from the host computer 2 and supplies the data to the host computer 2. The disk 90 is a partial ROM disk described above.

A controller 11 controls communications with the host computer 2, and recording and reproduction operations of the recording and reproduction apparatus 1.

The controller 11 executes actual recording and reproduction operations through a digital signal processor (DSP) 19. The DSP 19 has a function of a so-called servo driver. The DSP 19 sends a spindle drive controlling signal to a spindle driver 21 according to zone information (address) sent from the controller 11 to apply a drive signal to a spindle motor 22. Then, the disk 90 rotates in zone CAV mode.

To emit a laser from a laser diode 15a in an optical head 15, the DSP 19 sends a drive controlling signal to a laser driver 16 to control laser emission. Laser light emitted from the laser diode 15a passes through an optical system (not shown) and illuminates the disk 90 through an objective lens 15b. Light reflected from the disk 90 passes through an optical system (not shown), illuminates a photodetector 15c, and is taken out as an electric signal.

The electric signal obtained by the photodetector 15c is sent to an I-V/matrix amplifier 17. It is converted from current to voltage, and then various signals are taken out from it by a matrix-operation amplifier. They include an RF signal which is to be reproduction data from the ROM area AE in the disk 90, an MO signal which is to be reproduction data from the rewritable area ARW in the disk 90, a focus error signal, a tracking error signal, and a front APC signal.

The focus error signal, the tracking error signal, and the front APC signal are converted to digital data and sent to the DSP 19.

According to the focus error signal and the tracking error signal, the DSP 19 generates servo driving signals and sends them to a PWM driver 20. The PWM driver 20 supplies driving power to a focus coil, a galvano motor, and a slide motor placed in the optical head 15.

Receiving a focus servo driving signal based on the focus error signal, the PWM driver 20 supplies driving power to the focus coil. The objective lens is driven to approach or separate from the disk in focus control. Receiving a tracking servo driving signal and a slide servo driving signal according to the tracking error signal, the PWM driver 20 supplies driving power to a galvano motor and the slide motor for tracking control and sled-movement control.

The DSP 19 controls the laser driver 16 according to the front APC signal to maintain an appropriate laser level.

Data read from the disk 90 during reproduction is obtained as an RF signal or an MO signal from the I-V/matrix amplifier 17. The output of the I-V/matrix amplifier 17 is set to an appropriate voltage level by a gain/offset controller 23 and digitalized by an A/D converter 24.

The digitalized signal is sent to an encoder/decoder 12 and converted to a reproduced data with digital filter processing, Viterbi decoding, non-return-to-zero decoding, and descramble processing.

The reproduced data is sent to the host computer 2 through the controller 11.

To generate a reproduction clock and various timing signals synchronized with a reproduction signal used in reproduction, the output of the A/D converter 24 is also sent to a PLL timing generator 25. With so-called PLL operations, a reproduction clock and various timing signals based on the reproduction clock are generated.

When the host computer 2 sends a recording request command and data to be recorded, the controller 11 sends the data to the encoder/decoder 12 to encode the data in the form used in actual recording on the disk 90. The encoded data is sent to a magnetic-head driver 13. The magnetic-head driver 13 applies a magnetic field to the disk 90 by the magnetic head 14 according to the data.

In recording, the laser diode 15a emits a high-level laser for recording.

A memory device which does not lose its data even if its power is off, such as ROM and nonvolatile RAM, is used as memory 26. The memory 26 stores the drive ID unique to the recording and reproduction apparatus 1. The controller 11 references the drive ID as required.

A hard disk drive 3 for recording and reproduction on and from a hard disk 4 is built in or connected to the host computer 2.

When the user purchases software in the form of a partial ROM disk, the user loads the disk 90 to the recording and reproduction apparatus 1, and installs an application program recorded in the disk 90 to the hard disk 4. And then, the user uses the function of the application program by manipulating the hard disk drive 3 with operations on the host computer 2 to read the program from the hard disk 4.

A display 5 which is an output unit of the host computer 2 is formed by a CRT monitor or a liquid-crystal monitor. The user operates the computer while watching the display 5 and receives information. An ID input operation described later will be done according to an instruction shown on the display 5.

3. Protection-Function Identification Information and Condition Information Recorded in a Disk In the present embodiment, protection-function identification information and condition information are recorded at the specified position in the disk 90. Assume that these kinds of information is stored in the SFP zones (outer control SFT zone and inner control SFP zone).

Each section (2048 bytes) in the SFP zones generally records information shown in FIG. 5.

In bytes 0–19, the same data as that stored in the 20-byte data section of the sector in the GCP zone is recorded. The data includes physical management information such as medium physical information (MO, ROM, etc), a medium type (such as those for a ROM medium entirely formed by embossed pits, a RAM medium entirely formed by MO areas, and a partial ROM medium), a format descriptor, the start track number in an SFP zone, the maximum read power, and the clock ratio in a control track.

In bytes 20–29, medium-information data such as the wavelength of a laser, a reflection rate, and a track pitch is recorded.

In bytes 30–99, system-information data is recorded such as the maximum track number, the maximum physical-block address, the start physical-block address of a disk definition structure (DDS), the number of tracks in the test zone, the number of bytes in the user area, and, for a partial ROM disk or a ROM disk, control information of 16 bands (band 0 to band 15).

In bytes 100–419, detailed information of each of 16 bands (band 0 to band 15) is recorded. The information includes the start track address of each band, the total number of tracks, the total number of sectors, the number of sectors in the user area, the number of parity sectors, the number of sectors in each of the preceding and following buffers, the number of segments in a sector, and a clock ratio.

In the present embodiment, various IDs are stored in the SFP zones. Therefore, bytes 420–499 are used as an ID area. Any particular bytes may be assigned to an ID area at byte 500 or later, or an ID area may be provided in a zone other than the SFP zones.

In the SFP zones, medium-type information including the protection-function identification information is recorded in order to determine whether a protection operation described later is to be applied to the disk. A protection-function flag $F_{FBm}$ for specifying an ID requested to each band is also recorded. As actual condition information, a medium ID and other IDs (from the first ID to the fourth ID, maximum) are recorded.

A medium type is recorded in byte 1 (second byte) in a sector of the SFP zones. In this one byte, information shown in FIG. 6 is recorded.

When byte 1 stores 00h (h indicates that the preceding number is noted in hexadecimal), namely the eight bits are 00000000, the disk is a ROM medium. When byte 1 stores 20h or A0h, the disk is a RAM medium or a partial ROM medium, respectively.

When byte 1 stores 10h (00010000), the disk is a ROM medium with a protection function. When byte 1 stores 30h (=00110000), the disk is a RAM medium with a protection function. When byte 1 stores B0h (=10110000), the disk is a partial ROM medium with a protection function.

Since this area stores the same data as that stored in the GCP zone, the medium type code, which identifies the provision of a protection function, is also recorded in the GCP zone.

In the present embodiment, medium type codes indicating that the disk is a medium with a protection function are set to 10h, 30h, and B0h. The type codes are not limited to these codes. Particular codes need to be assigned.

The area for the medium type in byte 1 may be not necessarily used. A special flag area indicating the disk has a protection function may be provided.

In the present embodiment, the above medium-type code indicates that a protection function is provided for the entire disk, and an ID input request can be set as a protection function for each band. For this reason, the protection function flag $F_{FBm}$ for specifying an ID required to each band is recorded. This flag is, for example, recorded in bytes 76–91 in a sector of the SFP zones. Bytes 76–91 are included in the system-information area in FIG. 5. As specifically shown in FIG. 7A, bytes 76–91 correspond to band 0 to band 15, respectively, and each band information is recorded.

Figures 7A, 7B:
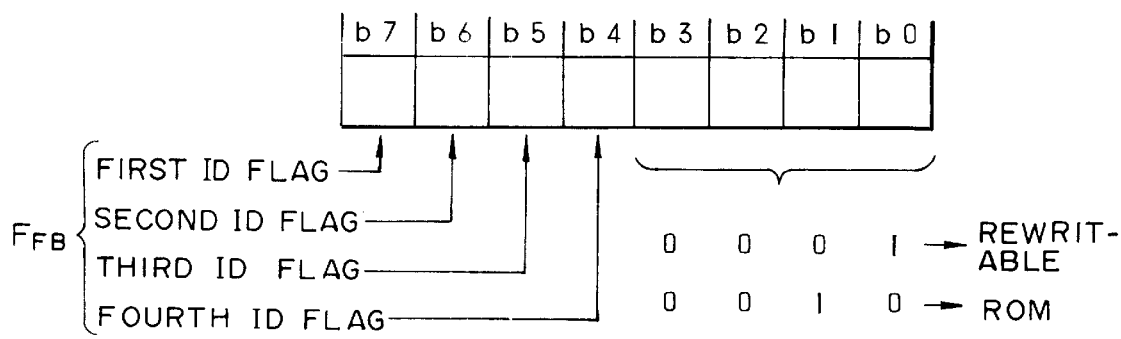
FIGS. 7A and 7B show a protection-function flag for the partial ROM disk according to the embodiment.

Among the eight bits of each byte, four bits b3–b0 shown in FIG. 7B indicate that each band serves as a rewritable area or a ROM area. In other words, when bits b3–b0 are 0001, the band serves as a rewritable area. When they are 0010, the band serves as a ROM area.

FIG. 7A indicates an example of eight-bit codes actually recorded in bytes 76–91. In this case, it is indicated by four bits b3–b0 that, in this partial ROM disk, band 0 to band 7 are included in a rewritable area ARW, and band 8 to band 15 are included in a ROM area AE.

In the present embodiment, bits b7–b4 serve as a protection-function flag $F_{FB}$ for each band as shown in FIG. 7B. They correspond to the first ID flag to the fourth ID flag.

When bit b7 is set to 1, for example, it indicates that the first ID flag is on. When the first ID flag is on, it indicates that the first ID is requested to be input in order to perform recording or reproduction for the band.

Since four bits b7–b4 are used as the first ID flag to the fourth ID flag, any ID requested to each band can be specified. It is also possible to specify that the inputs of four IDs, the first ID to the fourth ID, are requested to allow recording/reproduction.

As shown in FIG. 7A, for example, since bit b7 to bit b4 in the band 0 (byte 76) are 0000, any of the first ID to the fourth ID is not required for recording/reproduction for band 0.

For band 1 and band 2 (bytes 77 and 78), since bit b7 to bit b4 are 1000, the first ID is requested for recording/reproduction. Since bit b7 to bit b4 are 1111 in band 15 (byte 91), all of the first ID to the fourth ID are requested for data recording/reproduction for band 15.

Four bits are used for the protection-function flag $F_{FB}$ in bytes 76–91. A special zone for the protection-function flag may be set. Of course, it may be disposed outside the SFP zones.

In the present embodiment, four IDs, the first to fourth IDs, are used in addition to the above-described medium ID, and these IDs can be requested to each band. Three or less IDs other than the medium ID, or five or more IDs other than the medium ID may be used.

In the present embodiment, IDs are recorded in bytes 420–499. When each ID has 16 bytes, for example, as shown in FIG. 8, the medium ID is recorded in bytes 420–435. The first ID is recorded in bytes 436–451, the second ID in bytes 452–467, the third ID in bytes 468–483, and the fourth ID in bytes 484–499, as required.

The positions where these IDs are stored are not limited to those described in the present embodiment. Especially when an ID itself is to be changed, a certain position in a defect management area DMA, not in a SFP zone, can be used as an ID storage area. The same condition can be applied to the protection-function flag $F_{FB}$.

The number of IDs to be recorded can be set to any value. In the present embodiment, since the protection-function flag $F_{FB}$ has four bits, up to four IDs in addition to the medium ID, the first to fourth IDs, can be recorded. More than four IDs can be provided when the corresponding protection-function flag $F_{FB}$ is prepared.

4. Data Protection

Data protection in a case in which the disk 90 that records the above-described protection-function identification information and condition information is loaded into the recording and reproduction apparatus 1 will be described below.

This data protection specifies the condition that only a certain user can perform recording/reproduction for a certain disk in a certain recording and reproduction apparatus in order to maintain data confidentiality and to prevent data from being illegally used.

Figure 11:
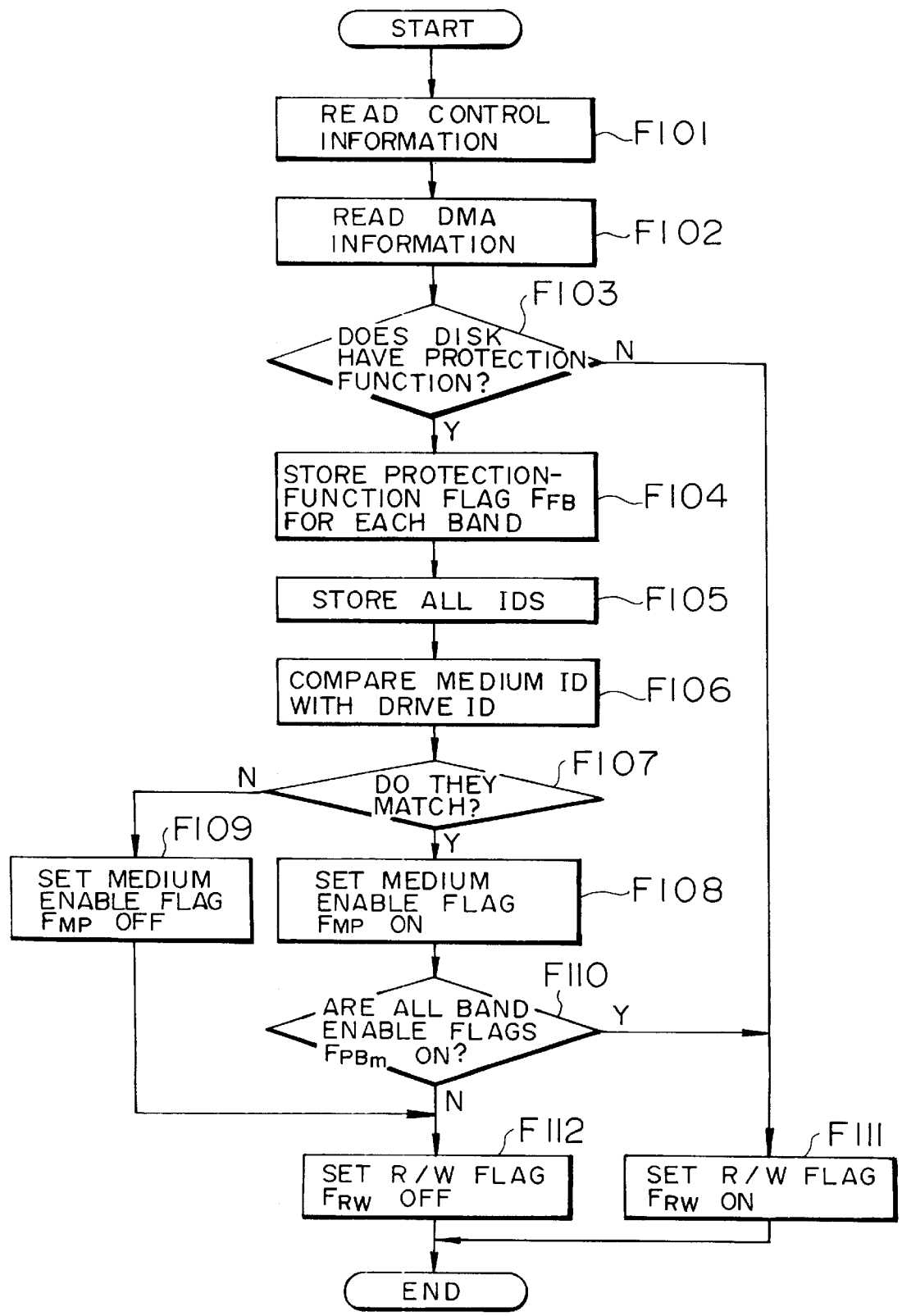
FIG. 11 is a flowchart of an ID check process performed when a disk is inserted, according to the present embodiment.

FIG. 11 shows an ID checking procedure performed in the controller 11 of the recording and reproduction apparatus 1 when the disk 90 is loaded.

When the disk 90 is inserted, the controller 11 reads control information recorded in the GCP zone and the SFP zones from the disk 90 (step F101). When it is detected from the read control information that the disk 90 is a partial ROM disk or a RAM disk, information in a defect management area DMA is read (step F102).

The procedure proceeds to ID verification processing after necessary information is read in steps F101 and F102. In step F103, it is detected whether the loaded disk 90 is a disk with a protection function. As described above, when the disk type code stored in byte 1 of the sector in the SFP zones is 10$h$, 30$h$, or B0$h$, it is detected that the disk has a protection function.

When the disk does not have a protection function, in other words, when the disk type code is 00$h$, 20$h$, or A0$h$, since there is no conditions required for recording/reproduction, the procedure advances to step Fill to set a read/write flag $F_{RW}$ (hereinafter called a R/W flag) to "on," and the procedure is terminated.

The R/W flag $F_{RW}$ is set inside the controller 11, and indicates that recording/reproduction is enabled/disabled for the disk 90. Namely, when the R/W flag $F_{RW}$ is set to "on," the controller 11 performs recording/reproduction for the loaded disk 90 according to a request from the host computer 2. On the other hand, when the R/W flag $F_{RW}$ is set to "off," the controller 11 does not perform recording/reproduction for the disk 90 even if the host computer 2 requests recording/reproduction.

When the loaded disk is not a disk with a protection function, since the R/W flag $F_{RW}$ is set to "on" when the disk is loaded, recording/reproduction is performed according to a request from the host computer. Recording/reproduction according to a request from the host computer 2 will be described later by referring to FIGS. 14 and 15.

When the disk type code is 10h, 30h, or B0h and therefore it is detected that the disk has a protection function, the procedure advances to step F104 to read a protection-function flag $F_{FBm}$ for each band. In other words, four bits b7–b4 in each of bytes 76–91 in the SFP zones shown in FIG. 7A are read.

In step F105, all IDs are read. All the IDs refer to the medium ID and the first to fourth IDs recorded in bytes 420–499 in the SFP zones shown in FIG. 8.

In step F106, the medium ID of the disk 90 is compared with the drive ID which is unique to the recording and reproduction apparatus 1 and stored in the memory 26. When they match, the procedure proceeds from step F107 to step F108 to set the medium enable flag $F_{MP}$ to "on." When they are not equal, the procedure advances to step F109 to set the medium enable flag $F_{MP}$ to "off."

The medium enable flag $F_{MP}$ is specified inside the controller 11 and is set to "on" when the medium ID and the drive ID match. These medium ID and drive ID can be set such that they match when recording/reproduction can be performed for the disk in the recording/reproduction apparatus. The medium ID may be a manufacturer ID.

Enable flags include, in addition to this medium enable flag $F_{MP}$, a band-0 enable flag $F_{PB0}$, a band-1 enable flag $FPB_1$, ..., and a band-15 enable flag $F_{PB15}$ corresponding to bands 0 to 15. The band-O enable flag $F_{PB0}$ to band-15 enable flag $F_{PB15}$, which enable recording/reproduction to be performed for the corresponding bands, are set to "on" when all conditions indicated by the corresponding protection-function flags $F_{FB}$ having four bits are satisfied.

The above-described R/W flag $F_{RW}$ is set to "on" when the medium enable flag $F_{MP}$ and the band-0 enable flag $F_{PB0}$ to the band-15 enable flag $F_{PB15}$ are all set to "on."

Therefore, when the medium enable flag $F_{MP}$ is set to "off" in step F109, or when it is detected in step F110 that an off enable flag is left although the medium enable flag $F_{MP}$ is set to "on" in step F108, the R/W flag $F_{RW}$ is set to "off" in step F112 and the procedure is terminated.

On the other hand, when the medium enable flag $F_{MP}$ is set to "on" in step F108, and it is detected in step F110 that an off enable flag is not left, the procedure proceeds to step Fill to set the R/W flag $F_{RW}$ to "on" and the procedure is terminated.

The medium ID is compared with the drive ID in the procedure shown in FIG. 11. If the medium ID and the drive ID do not match, the R/W flag $F_{RW}$ is not set to "on" and recording/reproduction cannot be performed for the disk 90.

In other words, it is checked whether the disk 90 can be used for the recording and reproduction apparatus 1. The protection function works so that recording/reproduction cannot be performed for the disk 90 in another recording and reproduction apparatus.

It is not necessary for even an authorized user to know a medium ID and a drive ID used in the protection function. They are automatically compared. Therefore, unauthorized use with an ID number identified from a memo written by the user cannot be achieved.

Figure 15:
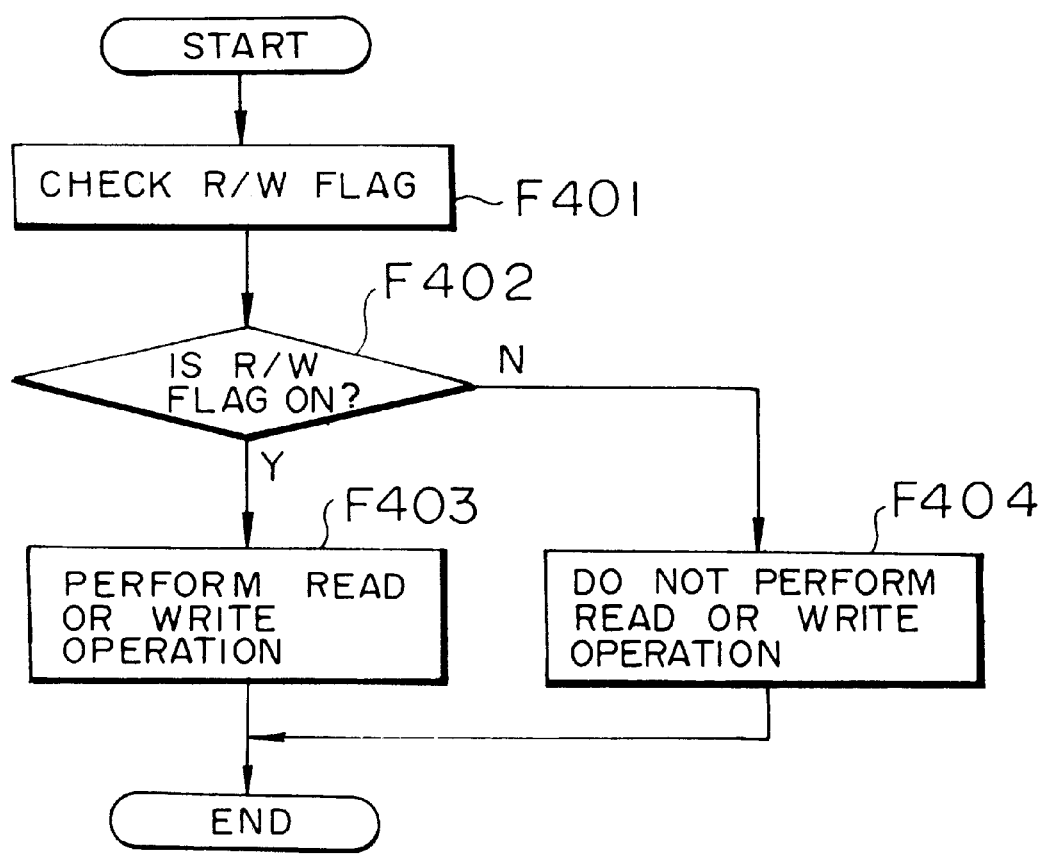
FIG. 15 is a flowchart of a procedure at a read/write request according to the embodiment.

FIG. 15 shows a process to be performed by the controller 11 in a case when the host computer 2 requests data read or data write.

When a read/write request is sent, the controller 11 checks the R/W flag $F_{RW}$ in step F401. When the R/W flag $F_{RW}$ is on, the process advances from step F402 to step F403 to execute the requested read or write operation. In contrast, when the R/W flag $F_{RW}$ is off, the process advances from step F402 to step F404, and the requested read or write operation is not performed and the process is terminated.

As described above, data confidentiality is maintained unless a medium ID and a drive ID match and the R/W flag $F_{RW}$ is set to "on."

To set the R/W flag $F_{RW}$ to "on," it is required not only that the medium ID and the drive ID match but also all of enable flags $F_{PBm}$ for bands (band-0 enable flag $F_{PB0}$, band-1 enable flag $F_{PB1}$, ..., and band-15 enable flag $F_{PB15}$) be set to "on" as described above. To set an enable flag $F_{PBm}$ for each band to "on," the user is required to input the ID specified for the corresponding enable flag $F_{PBm}$. When required IDs are input and all of the enable flags $F_{PBm}$ for the bands are set to "on," the R/W flag $F_{RW}$ is set to "on."

As described with FIG. 7A, IDs which are required to be input in order to release protection for each band are specified with the four-bit protection-function flag $F_{FBm}$ corresponding to each band. In the present embodiment, four IDs, the first to fourth IDs, are specified. In FIG. 7A, for example, since bits b7–b4 of the type code in byte 78 are 1000, the first ID is required to be input in order to release read/write protection for band 2. When the user correctly inputs the first ID for band 2, the requirement is satisfied and the band-2 enable flag $FPB_2$ is set to "on." On the other hand, since bits b7–b4 in band 15 are 1111, all of the first to fourth IDs are required to be correctly input. When these four IDs are input, the band-15 enable flag $F_{PB15}$ is set to As described above, it is necessary for the user to start a protection release program to set the enable flag $F_{PBm}$ for each band to "on. " The protection release program needs to be stored in advance in a ROM area AE when the disk 90 is a partial ROM disk or a ROM disk.

Figure 12:
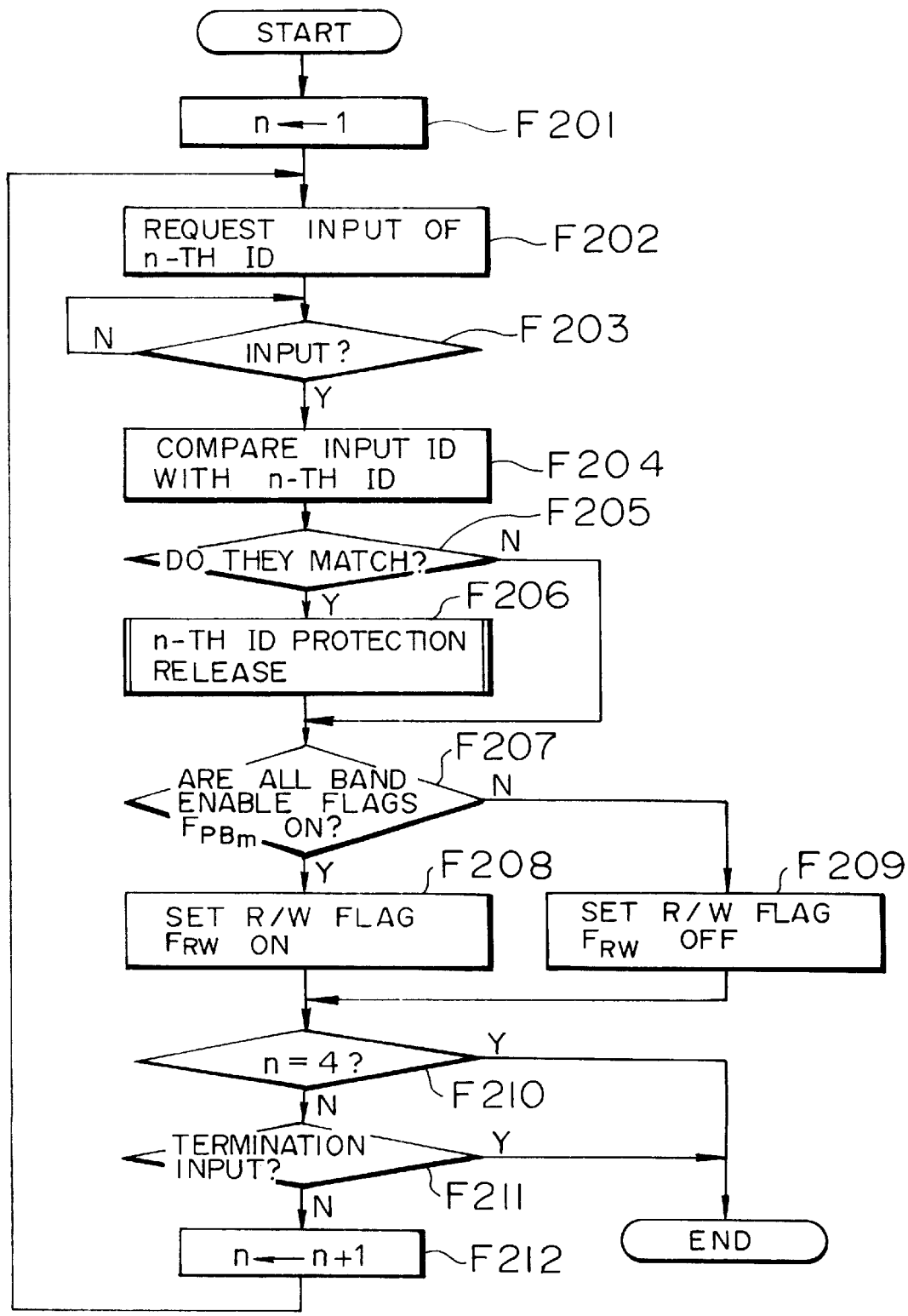
FIG. 12 is a flowchart of a procedure for a startup of a protection release program according to the present embodiment.

FIG. 12 shows a procedure which the controller 11 performs when the protection release program is started.

The controller 11 sets variable n to 1 in step F201. In step F202, the controller requests the input of the n-th ID. In other words, the controller asks the user to input the ID on the display 5 of the host computer 2, and waits for a user input operation (step F203). When the user inputs a value, the input value is compared with the n-th ID read from the disk 90 and it is detected whether they match.

When they match, the procedure advances from step F205 to step F206 and protection release is performed for the n-th ID.

Figure 13:
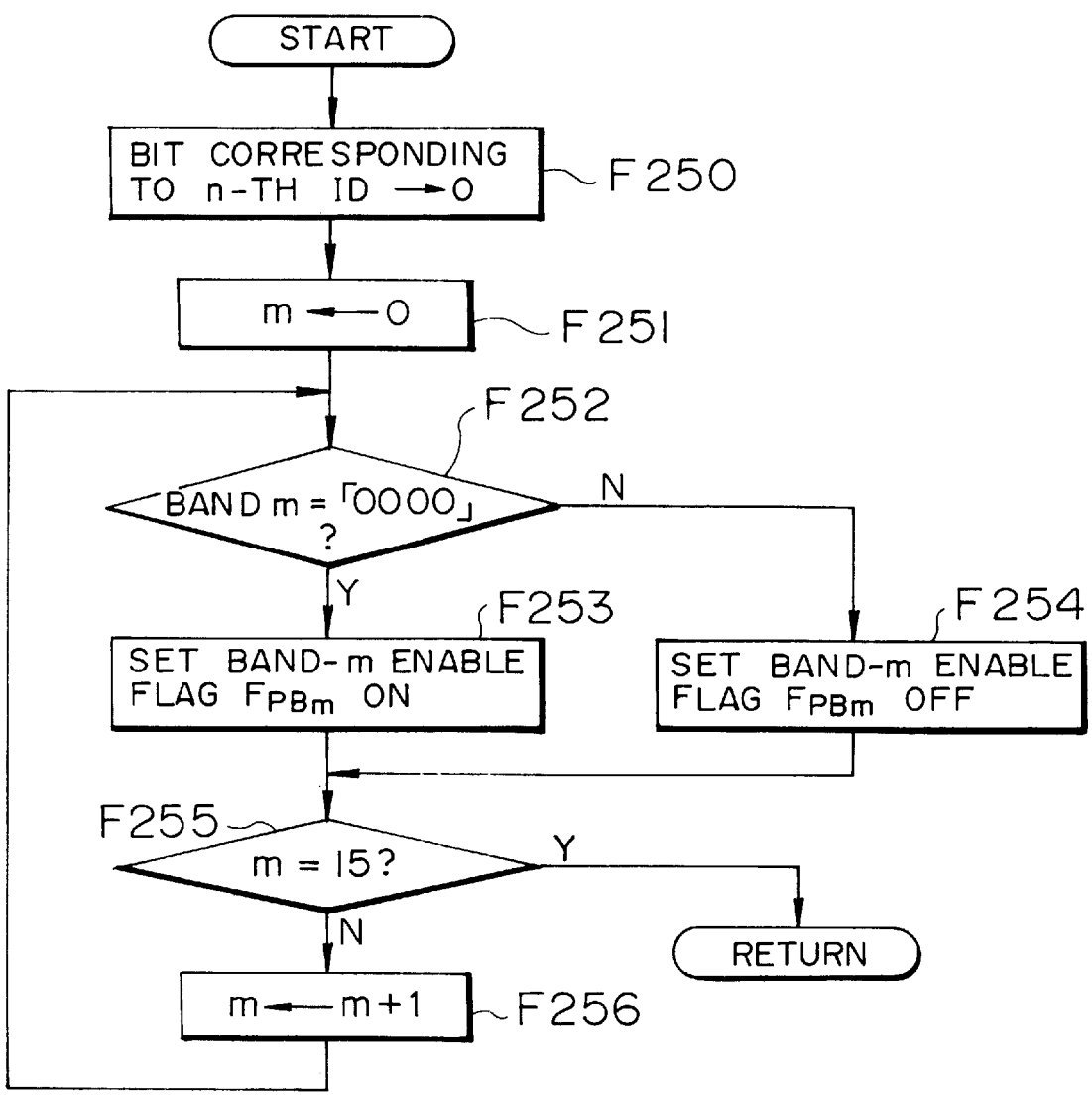
FIG. 13 is a flowchart of an n-th-ID release process according to the embodiment.

FIG. 13 shows an example of protection release for the n-th ID in step F206.

According to a case in which the input ID matches the n-th ID, the bit corresponding to the n-th ID is set to 0 among the protection-function flag $F_{FB}$ in step F250.

To perform protection release, it is necessary to read four bits, b7–b4, which indicate the protection-function flag $F_{FB}$, and store them in a register (not shown) in the controller 11. This operation is done in step F105 shown in FIG. 11.

As shown in steps F201 and F202 in FIG. 12, variable n is set to 1 and the first ID is required to be input. When the user correctly inputs the first ID, the first ID flag (bit b7) for each band, shown in FIG. 7B, namely, bits b7 of all type codes for band 0 to band 15 shown in FIG. 7A are set to 0 on the register in the controller 11, in step F250 shown in FIG. 13. For example, when the protection-function flag $F_{FB}$ for band 2 is 1000, in order words, when the first ID flag, namely, bit b7, is 1, if the first ID is correctly input, bit b7 is set to 0 and the protection-function flag $F_{FB}$ for band 2 is set to 0000 on the register.

In step F250, bits b7 for the other bands are set to 0 in the protection-function flags $F_{FBm}$ stored in the register.

In the next step F251, variable m is set to 0. In a loop from step F252 to step F256, a process for the band enable flag $F_{PBm}$ corresponding to each band is performed. The protection-function flag $F_{FB}$ for band 0 on the register is first checked (step F252). When it is 0000, the band-0 enable flag $F_{PB0}$ is set to "on" (step F253). If it is not 0000, the band-0 enable flag $F_{PB0}$ is set to "off" (step F254).

In step F256, variable m is incremented and the process returns to step F252. In other words, the same process will be performed for band 1 next.

The process is repeated until variable m reaches 15 in step F255, namely, until the processes for the band enable flags $F_{PBm}$ for all 16 bands are completed, and the processing shown in FIG. 13, namely the processing in step F206 shown in FIG. 12, is terminated.

When the procedure proceeds to step F207 from step F206 or step F205 in FIG. 12, all band enable flags $F_{PBm}$ are checked. When the medium enable flag $F_{MP}$ and band-0 enable flag $F_{PB0}$ to band-15 enable flag $F_{PB15}$ are all on, the R/W flag $F_{RW}$ is set to "on" (step F208). If any one of the flags is still off, the R/W flag $F_{RW}$ is set to "off" (step F209).

In step F210, variable n is checked and in step F211, user's termination operation is checked. It is detected that the protection release program is not to be terminated, variable n is incremented in step F212 and the procedure returns to step F202.

The procedure starts from step F202 this time. The second ID is required to be input, comparison is conducted according to the user input, and the second ID protection release is performed when the comparison result shows a matching condition.

These processes are repeated until the fourth ID, and when it is detected that variable n is four in step F210, the procedure in the protection release program is terminated.

Alternatively, even if the process is not yet repeated four times, when the user performs a termination operation at the middle, the procedure is terminated at step F211.

FIGS. 9A to 9D show a process in which protection for each band is released by the protection-function program.

FIG. 9A shows the state of the register in the controller 11 at the time when the disk 90 with a protection function is loaded. In other words, it is a state in which the protection-function flag $F_{FBm}$ for each band and all IDs are stored in the register or the flag is set in steps F104 and F105 from the information read in steps F101 and F102 in FIG. 11.

Assuming that in the disk 90 the protection-function flag $F_{FBm}$ for each band is set as shown in FIGS. 7A and 7B, four bits b7–b4 are stored as the protection-function flag $F_{RBm}$ for each band.

From this state, the medium ID is compared with the drive ID in step F106. When they match, the medium enable flag $F_{MP}$ is set to "on" as shown in FIG. 9B in the process in step F108.

The enable flag $F_{PBm}$ for each band is set to "on" when the corresponding four bits b7–b4 are 0000 on the register.

In the state shown in FIG. 9B, all enable flags $F_{PBm}$ are not on. Therefore, the procedure in FIG. 11 advances to step F112 to set the R/W flag $F_{RW}$ to "off." Since bits b7–b4 are 0000 in band 0, the band-0 enable flag $F_{PB0}$ is on from the start.

Then, the protection release program shown in FIG. 12 is started. Assuming that in response to the first ID input request the user correctly inputs the first ID, the first ID flag, namely bit b7, in the four bits of each of the band-0 protection-function flag $F_{FB0}$ to the band-15 protection-function flag $F_{FB15}$ is set to 0 in the first-ID protection release, and the state is changed to that shown in FIG. 9C. At this time, due to the process from step F252 to step F256 in FIG. 13, the enable flag $F_{FBm}$ corresponding to a band for which bits b7–b4 are 0000 is set to "on," such as the band-1 enable flag $F_{PB1}$ the band-2 enable flag $F_{PB2}$, and the band-6 enable flag $F_{PB6}$.

When the user correctly and sequentially inputs the second ID to the fourth ID successively, the protection-function flags $F_{FBm}$ for all bands finally become 0000 as shown in FIG. 9D, and therefore, the band enable flags $F_{PBm}$ for all the bands are set to "on." Then, the R/W flag $F_{RW}$ is set to "on" in step F208 in FIG. 12.

FIGS. 10A and 10B show a case in which a disk for which protection for each band is not specified is loaded. In other words, bits b7–b4, the protection-function flags $F_{FB}$ for all bands, are 0000 in the SFP zones on the disk and the protection-function flags $F_{FB}$ are stored in the register as shown in FIG. 10A. In this case, it is considered that the enable flags $F_{pBm}$ for all bands are on.

From this state, the medium ID is compared with the drive ID in step F106 in FIG. 11. When they match, the medium enable flag $F_{MP}$ is set to "on" as shown in FIG. 9B in step F108. Since the enable flags $F_{PBm}$ for all bands are also set to "on," the procedure advances to step F111, and the R/W flag $F_{RW}$ is set to "on."

Assuming that the process shown in FIG. 15 is to be performed when recording/reproduction is requested, recording/reproduction can be enabled for the disk only when the R/W flag $F_{RW}$ is set to "on" as shown in FIG. 9D or FIG. 10B, and a strict protection function is achieved.

The process shown in FIG. 15 does not achieve the advantage that protection can be released separately for each band due to the protection function provided for each band as shown in FIGS. 9A to 9D. Therefore, when the host computer 2 requests recording/reproduction, the controller 11 may perform the process shown in FIG. 14.

Figure 14:
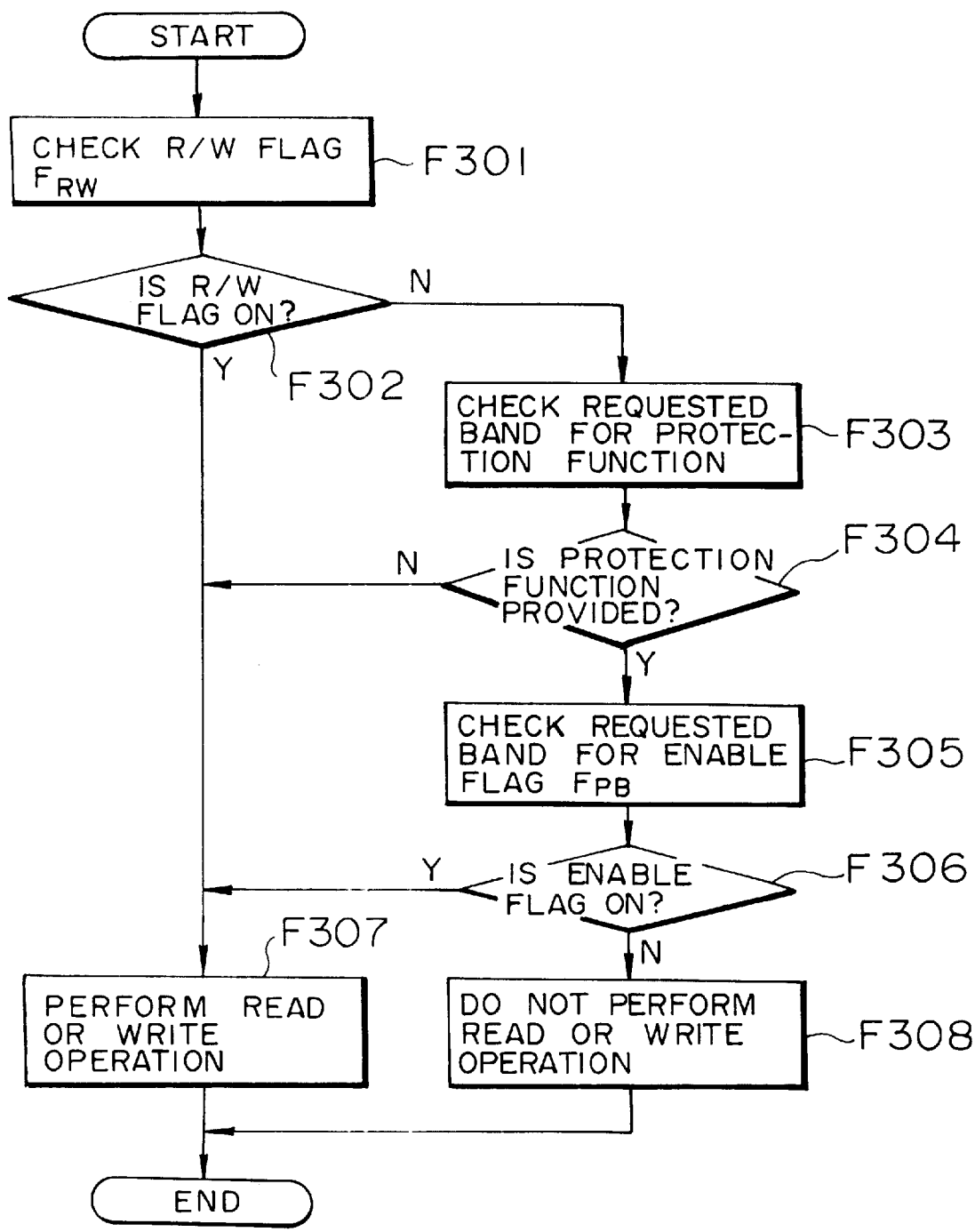
FIG. 14 is a flowchart of a procedure at a read/write request according to the embodiment.

In the process shown in FIG. 14, when the host computer 2 requests a data read or data write operation, the controller 11 first checks the R/W flag $F_{RW}$ in step F301. When the R/W flag $F_{RW}$ is on, all enable flags $F_{PBm}$ have been set to "on" (namely, protection release conditions are all satisfied). Therefore, the procedure advances to step F307 from step F302, and the requested read or write operation is performed.

On the other hand, when the R/W flag $F_{RW}$ is off, the procedure advances from step F302 to step F303. Whether a protection function is provided for the band for which the requested read or write operation is to be performed is checked. When the protection-function flag $F_{FB}$ recorded in the disk 90 for the band is 0000, the band is not provided with a protection function. In a case in which a data file is not confidential and a protection function is not specified from the beginning, there is no problem in performing recording/reproduction for that data file. The procedure proceeds to step F307 from step F304 to execute the requested read or write operation.

When it is detected in step F304 that the band is provided with a protection function, the enable flag $F_{PBm}$ specified in the register, for the band, is checked in step F305. When the enable flag $F_{PBm}$ is on, the ID input required for the band has been entered. Therefore, the procedure advances from step F306 to step F307 to execute the requested read or write operation.

When it is detected in step F306 that the enable flag $F_{PBm}$ is not on, protection release conditions for the band are not satisfied. Therefore, the procedure proceeds to step F308. The requested recording/reproduction operation is not performed and the procedure is terminated.

As described above, a protection function and conditions can be specified at different levels for each band.

For example, recording/reproduction can be performed for band 0 at the time shown in FIG. 9B. Recording/reproduction can also be conducted for band 0, band 1, band 2, and band 6 at the time shown in FIG. 9C.

By specifying the strength of a protection function separately for each band, precise protection can be achieved according to the level of data confidentiality.

Not only by changing the number of requested IDs but also by changing an ID to be requested, when authorized users are told different IDs, bands for which protection can be released and for which protection cannot be released can be specified for each user.

In the present embodiment, as shown in FIG. 6, the disk type code indicates whether a protection function is provided. In an old-type recording and reproduction apparatus which does not handle a protection function, only disk type codes of 00$h$, 20$h$, and A0$h$ are received. If the other disk type codes are detected, it is regarded as a disk error and recording/reproduction is not performed. In other words, recording or reproduction cannot be performed for a disk having a protection function described in the present embodiment in an old-type recording and reproduction apparatus which does not handle the protection function. This means that data is protected even with the old-type recording and reproduction apparatus, and data confidentiality is successfully maintained.

The present invention can also be applied to various types of processes and recording data in addition to the foregoing embodiment.

For a partial ROM disk, different medium IDs or other IDs may be assigned to the ROM area AE and the rewritable area ARW.

For a partial ROM disk and a RAM disk, when an ID is recorded in the rewritable area ARW, since an ID unique to each disk can be easily recorded and the ID can be changed, a more flexible protection function is achieved.

In the present embodiment, it is required that the medium ID match the drive ID for recording/reproduction. An ID code system may be used in which the medium ID corresponds to the drive ID with some rule/calculation.

A file data usually recorded on a disk is controlled by management information called a file system and is read/written. To combine the file system with the confidentiality maintenance function with IDs described above, the file system may automatically request an ID input when a read/write operation is required for a data file for which the protection function is not released. When the ID appropriate for the data file is input, the required read/write operation is executed.

In this case, the user is requested to input an ID, as required, when accessing a file. An error is not suddenly indicated due to access not being permitted by a protection function. Therefore, an easy-to-understand operation environment can be provided even for laypersons.

Protection may be made stronger in writing than in reading by using the procedure shown in FIG. 14 for writing and that shown in FIG. 15 for reading.

As described above, in the present invention, protection-function identification information and condition information which indicates certain conditions for enabling the protection function are recorded in a recording medium. A recording or reproduction apparatus stores apparatus ID information assigned to that recording or reproduction apparatus. When it is detected from the protection-function identification information of the recording medium loaded into the apparatus that a protection function is provided, the recording-medium ID information, which is the condition information of the recording medium, is compared with the apparatus ID information stored in storage means. When they have the correct relationship, a recording or reproduction operation is permitted for the recording medium. Since the recording-medium ID information and the apparatus ID information cannot be seen by the user, the ID information is not stolen and data confidentiality is strictly protected.

When one or more pieces of condition information are recorded in the loaded recording medium, in addition to recording-medium ID information, if the condition specified by these pieces of condition information needs to be satisfied in order to permit a recording or reproduction operation for the recording medium after it is detected that the recording-medium ID information corresponds to the apparatus ID information, a multiple-level protection function is achieved and more strict protection is provided.

Furthermore, when condition information such as an ID-input request is additionally specified for each area in a recording medium, the strength of protection can be changed according to the areas and protection can be set according to the user. This means that flexible protection can be provided according to the importance of data.

What is claimed is:

1. A recording-medium driving system comprising:

a recording-medium driving apparatus;

a recording medium configured for use with said recording-medium driving apparatus; and a computer program recorded on said recording medium for controlling said recording-medium driving apparatus;

wherein said recording medium driving apparatus includes:
  protection-function detecting means for detecting whether said recording medium has a protection function;
  comparison means for comparing first identification information recorded in said recording medium with second identification information of said recording-medium driving apparatus when said recording medium has said protection function; and
  control means for controlling access to said recording medium via an information signal when said comparison means detects a predetermined relationship between said first identification
wherein said recording medium includes:
  a first recording area on which recording protection-function identification information is recorded which indicates whether said protection function for setting a limit of access via said information signal by said recording-medium driving apparatus is provided;
  a second recording area on which said first identification information is recorded;
  a third recording area on which said computer program is recorded; and
  fourth recording area having a storage area on which information is recorded, and
wherein said computer program controls said recording-medium driving apparatus to execute processing including the steps of:
  requesting user input of an input identifier;
  comparing said input identifier with a recorded identifier, corresponding to said storage area, that is read from said recording medium; and
  enabling access to said storage area, for at least one of reading and writing, in accordance with said step of comparing.

2. A recording-medium driving system according to claim 1, wherein:
  said fourth recording area has a plurality of storage areas including said storage area;
  said step of requesting comprises requesting user input of a plurality of input identifiers including said input identifier;
  said step of comparing comprises comparing said plurality of input identifiers with a plurality of recorded identifiers including said recorded identifier that is read from said recording medium, wherein said plurality of recorded identifiers correspond to said plurality of storage areas; and
  said step of enabling comprises separately enabling access to each of said plurality of recording areas, for at least one of reading and writing, in accordance with said step of comparing, such that one of said plurality of storage areas is associated with one or more of said plurality of recorded identifiers.

* * * * *

UNITED STATES PATENT AND TRADEMARK OFFICE
CERTIFICATE OF CORRECTION

PATENT NO. : 6,243,796 B1
DATED : June 5, 2001
INVENTOR(S) : Satoshi Otsuka

It is certified that error appears in the above-identified patent and that said Letters Patent is hereby corrected as shown below:

Column 6,
Line 42, delete "information is" and insert -- information are --.

Column 9,
Line 10, delete "there is" and insert -- there are --;
Line 11, delete "step Fill" and insert -- step F111 --;
Line 54, delete "FPB$_1$" and insert -- F$_{PB1}$ --.

Column 10,
Line 4, delete "Fill to set" and insert -- F111 to set --;
Line 53, delete "flag FPB$_2$" and insert -- flag F$_{PB2}$ --;
Line 55, after "is set to", insert -- on --.

Column 12,
Line 35, after "F$_{PB1}$" insert -- , --.

Column 15,
Line 14, after "first identification" insert -- information and said second identification information, --.

Signed and Sealed this

Twelfth Day of March, 2002

*Attest:*

*Attesting Officer*

JAMES E. ROGAN
*Director of the United States Patent and Trademark Office*